United States Patent Office 3,172,901
Patented Mar. 9, 1965

3,172,901
PROCESS FOR THE SULFATION OF HIGHER ALCOHOLS
Kenichi Miyamoto, Yuumi Aritomi, Hajime Ichida, and Sozaburo Irie, all of Tsurumi-ku, Yokohama, Japan, assignors to Nitto Chemical Industry Co., Ltd., Tokyo, Japan, a corporation of Japan
No Drawing. Filed June 7, 1961, Ser. No. 115,304
Claims priority, application Japan, June 8, 1960, 35/26,923; May 2, 1961, 36/15,288
14 Claims. (Cl. 260—459)

The present invention pertains to a process for the sulfation of higher alcohols. More particularly, it pertains to the improvement in the process for the sulfation of higher alcohols having 8 to 20 carbon atoms by use of diammonium imidodisulfonate, which improvement comprises conducting said sulfation in the presence of an N,N-dialkylcarbamyl compound represented by the general formula of $R_1CONR_2R_3$, wherein $R_1$ is selected from hydrogen atom, and methyl and ethyl groups, and each of $R_2$ and $R_3$ is selected from methyl and ethyl groups.

Salts of sulfuric acid ester of higher alcohols, namely alkyl sulfate are superior surface active agent, and have been produced commercially in a large scale. The available methods for producing such compounds have, in general, been the sulfation of higher alcohols by use of concentrated sulfuric acid, sulfur trioxide, or chlorosulfonic acid. These agents for sulfation, however, have much difficulties, for examples, they are difficult to deal with, because of the fuming, hygroscopic, injurious, and other properties. Besides, scaling up of apparatus for speeding up of the reaction, in which such agents are used, is hard, since the reaction is exceedingly exothermic so that cooling is needed for moderate reaction. Of these methods, the one by use of concentrated or fuming sulfuric acid is the most conventional, but the latter has to be employed in considerably excess of amount over a higher alcohol used, thereby needing neutralization with, for example, caustic soda after termination of the reaction. The Glauber's salt by-produced herein should be removed when its presence is excluded. In case of sulfation of unsaturated alcohol, such as oleyl alcohol, furthermore, not only the terminal hydroxyl groups, but even the double bond is sulfated by sulfuric acid, whereby excessive sulfuric acid is needed. Moreover, the product has an inferior detergent effect. These are remarkable disadvantages of the conventional method.

Avoiding the difficulties in said conventional method, a method has been suggested wherein sulfamic acid is used as sulfation agent, which is easy to deal with under moderate conditions. But it is a disadvantage of this method that sulfamic acid is extremely expensive, as compared with the conventional sulfation agents.

While, attempts have been made wherein diammonium imidodisulfonate, which also can easily be dealt with, is employed as sulfation agent. (For instance, see German Patent No. 557,428 and U.S. Patent No. 1,931,962.) In these methods, higher alcohols are sulfated by use of diammonium imidodisulfonate in pyridine solution. But, these methods also have some difficulties in that 5 to 10 hours of reaction period is necessary, that the yield is no more than 70 to 80% based upon the higher alcohol, and that expensive pyridine is needed in a larger amount.

After experimentation with other easily operative and inexpensive sulfation methods, the inventors have discovered that higher alcohols can be sulfated by use of diammonium imidodisulfonate in the presence of a N,N-dialkylcarbamyl compound represented by the general formula of $R_1CONR_2R_3$, with much superior results. In the above-identified formula, $R_1$ is selected from hydrogen atom, and methyl and ethyl groups and each of $R_2$ and $R_3$ is selected from methyl and ethyl groups.

Thus, an object of the invention is to provide a process for the sulfation of higher alcohols, which is easily operative, and is economical. Another object of the invention is to provide an improvement in the conventional process for sulfation of higher alcohols, by which the process is conducted in a shorter period of time with a higher yield. Other objects and advantages of the present invention will be apparent to those skilled in the art from the description which follows.

To attain such objects, the present invention suggests an improvement in the process for the sulfation of higher alcohols having 8 to 20 carbon atoms by use of diammonium imidodisulfonate, which improvement comprises conducting said sulfation in the presence of a N,N-dialkylcarbamyl compound represented by the general formula of $R_1CONR_2R_3$, wherein $R_1$ is selected from hydrogen atom, and methyl and ethyl groups, and each of $R_2$ and $R_3$ is selected from methyl and ethyl groups.

The N,N-dialkylcarbamyl compounds employed in the present invention may be regarded as a reaction accelerator, or a catalyst, and include N,N-dimethylformamide, N,N-diethylformamide, N,N-dimethylacetamide, N,N-diethylacetamide, N,N-dimethylpropionamide, and the like.

As the higher alcohol starting material, those alcohols having 8 to 20 carbon atoms may be employed. Suitable alcohols include saturated or unsaturated aliphatic alcohols and may be employed either individually or as mixtures, e.g. produced from natural fatty acids of various sources. Suitable alcohols also include the synthetic alcohols such as oxo-alcohols.

Diammonium imidodisulfonate, $NH(SO_3NH_4)_2$, is now commercially produced at moderate prices from sulfur trioxide and ammonia as an intermediate in the course of sulfamic acid production. It is a nonvolatile, non-hygroscopic, stable, and crystalline compound. It has an inferior reactivity for sulfation, as compared with that of sulfamic acid. Hence, an adequate solvent or a catalytic material is necessary to obtain a sufficient reaction velocity in the sulfation. The inventors have discovered that the N,N-dialkylcarbamyl compound as identified above serves for exceeding improvement with respect to the reaction period and the yield, as compared with pyridine. In case of using N,N-dimethylformamide, which is typical in the present invention, for example, the yield of as high as 80 to 95% can be attained after the reaction period of 3 to 5 hours.

Moreover, the required amount of the compound is exceedingly small, as compared with that of pyridine. For example, approximately 15 to 30 parts of N,N-dimethylformamide corresponds to 100 parts of pyridine under the same reaction conditions.

As diammonium imidodisulfonate employed as sulfation agent in the present invention has a moderate reactivity, the reaction can readily be controlled. Therefore, when an unsaturated higher alcohol is used as the raw material, merely the hydroxyl radical is sulfated by this agent, while, the double bond remains unchanged. Thus, it is a feature of the invention that the process is suitably applicable for production of such unsaturated alkyl sulfate, which has particularly superior surface activity or detergent action.

For practising the process of the invention, a higher alcohol having 8 to 20 carbon atoms, diammonium imidodisulfonate and a N,N-dialkylcarbamyl compound represented by the above-mentioned formula, are mixed, and heated at a temperature of 130° C. to 170° C., preferably 140° to 150° C., for 2 to 6 hours, more preferably 3 to 5 hours. After the termination of the reaction, the mixture is distilled at ordinary or subatmospheric pressure to remove or recover the N,N-dialkylcarbamyl compound. The residue comprises the reaction product ester.

The mixing ratio of diammonium imidodisulfonate to the alcohol may be so that equivalent ratio of $SO_3$ group in the former to OH group in the latter is less than 1.8:1, more preferably less than 1.5–1.6:1. The amount of the N,N-dialkylcarbamyl compound is 0.5–5 parts by weight per alcohol.

In the more preferable modification of the invention, the N,N-dialkylcarbamyl compound is used as the mixture with a hydrocarbon solvent having a boiling range between 100° and 200° C. In other words, a part of the N,N-dialkylcarbamyl compound may be replaced by a hydrocarbon solvent having a boiling range between 100° and 200° C. By use of such hydrocarbon solvent, the N,N-dialkylcarbamyl compound is saved in its amount, and the recovering ratio of said compound is increased. It is also found that use of such hydrocarbon solvent with the N,N-dialkycarbamyl compound improves discoloration of the product ester. Besides, the amount of diammonium imidodisulfonate to be used can be reduced. Thus, the mixing ratio of diammonium imidodisulfate to the alcohol, in the case of using the N,N-dialkylcarbamyl compound along with the hydrocarbon solvent, may be so that equivalent ratio of $SO_3$ group to OH group is 1.0–1.3:1, preferably 1.05–1.1:1. Consequently, side reaction is suppressed, thereby the effective component in the reaction product being increased and the quality and color being extremely improved. Also, the recovering ratio of the N,N-dialkylcarbamyl compound is increased. In fact, the loss of such additives disappears, since this compound and the solvent can be recovered by azeotropic distillation, particularly when N,N-dimethylformamide and xylene, as the solvent, are used.

The hydrocarbon solvents employed along with the N,N-dialkylcarbamyl compound in the present invention are desirably those which cause no side reaction, which can be mixed with the N,N-dialkylcarbamyl compound, and which can easily be removed and recovered from the reaction system by distillation together with said compound. From such points of view, the solvent employed in the present invention is a hydrocarbon having a boiling range between 100° to 200° C., but a hydrocarbon having a boiling range between 120° to 180° C. is more desirable when an economical reaction condition is intended. Concretely speaking, a commercially available petroleum hydrocarbon solvent may be employed. As the petroleum hydrocarbon solvent, aliphatic, alicyclic, and aromatic hydrocarbon solvents are mentioned, which may be used either individually or as mixtures. The amount of the solvent, if added, is at least such that the reaction mixture can be agitated, but it may be 40% to 60% by weight, more suitably about 50% by weight of the total amount of the solvent and the N,N-dialkylcarbamyl compound. The amount of N,N-dialkylcarbamyl compound is 0.5–0.8 part by weight per alcohol.

*Example 1*

Into a 300 ml.-volume flask equipped with a stirrer, a reflux condenser and a thermometer, there are placed 26 g. of cetyl alcohol, 20 g. of diammonium imidodisulfonate, and 15 g. of N,N-dimethylformamide. The resulting mixture is held at temperature of 140° C. for 4 hours with stirring. After termination of the reaction, the dimethylformamide is recovered by distillation, and the remaining solid reaction product is taken out of the flask. The reaction ratio is 89%, based upon cetyl alcohol.

*Example 2*

Into a flask, there are placed 26 g. of oleyl alcohol, 20 g. of diammonium imidodisulfonate, and 20 g. of N,N-dimethylformamide, and the resulting mixture is held at temperature of 140° C. for 5 hours with stirring. After termination of the reaction, the dimethylformamide is recovered by distillation, and the remaining reaction product is taken out of the flask. The reaction ratio is 95%, based upon oleyl alcohol. Comparison of iodine number of the reaction product with that of the oleyl alcohol material shows that the reaction permits sulfuric acid-esterification merely at the hydroxyl group; the double bond in oleyl alcohol remaining unchanged.

*Example 3*

Into a flask, there are placed 26 g. of lauryl alcohol, 20 g. of diammonium imidodisulfonate, and 20 g. of N,N-dimethylacetamide. The mixture is held at temperature of 140° C. for 5 hours with stirring. After termination of the reaction, the dimethylacetamide is recovered by distillation, and the reaction product is taken out of the flask. The reaction ratio is 93% based upon lauryl alcohol.

*Example 4*

Into a flask, there are placed 26 g. of lauryl alcohol, 20 g. of diammonium imidodisulfonate, 10 g. of N,N-dimethylformamide, and 30 g. of kerosene. The resultant mixture is held at temperature of 140° C. for 5 hours with stirring. After termination of the reaction, the dimethylformamide and the kerosene are recovered by distillation, and the remaining reaction product is taken out of the flask. The reaction ratio is 85%, based upon lauryl alcohol.

*Example 5*

In to a three-necked, one liter-volume flask equipped with a reflux condenser, a stirrer, and a thermometer, there are placed 156 g. of oleyl alcohol, a mixture of 120 g. xylene and 120 g. of N,N-dimethylformamide (i.e. 1:1), and 79 g. of diammonium imidodisulfonate. The resultant mixture is allowed to react at temperature of 140° to 146° C. for 4.5 hours in nitrogen gas stream. After termination of the reaction, the dimethylformamide and the xylene are recovered by distillation at a subatmospheric pressure, and the remaining reaction product is taken out of the flask. The product is a light brown paste, and is obtained in 96.0% reaction ratio, based upon oleyl alcohol. The iodine number of the reaction product is 62, which exhibits ratio of residual double bond of 98%, calculated as ammonium salt of oleyl sulfate.

*Example 6*

Similarly as in Example 5, 156 g. of a mixed alcohol produced from sperm fatty acid, 120 g. of an aromatic hydrocarbon solvent (boiling at 185° to 200° C.), 120 g. of N,N-dimethylformamide, and 79 g. of diammonium imidodisulfonate, are allowed to react at temperature of 160° to 162° C. for 2.5 hours. After termination of the reaction, the dimethylformamide and the solvent are recovered by distillation at a subatmospheric pressure, and the remaining reaction product is taken out of the flask. The product is a pale yellowish white paste, the reaction ratio being 93.0%, calculated with the basis of oleyl alcohol.

*Example 7*

Similarly as in Example 5, 156 g. of a mixed alcohol produced from rice bran fatty acid, 120 g. of a mixed aliphatic and aromatic hydrocarbons solvent (boiling at 150° to 170° C.), 120 g. of N,N-dimethylformamide, and 79 g. of diammonium imidodisulfonate, are allowed to react at temperature of 155° to 158° C. for 3 hours. After termination of the reaction, the dimethylformamide and the solvent are recovered by distillation at a subatmospheric pressure, and the remaining reaction product is taken out of the flask. The product is a pale yellowish white paste, the reaction ratio being 91.2%, calculated with the basis of oleyl alcohol.

*Example 8*

Similarly as in Example 5, 156 g. of a mixed alcohol produced from beef tallow fatty acid, 120 g. of an aliphatic hydrocarbon solvent (boiling at 130° to 170° C.), 120 g. of N,N-dimethylformamide, and 79 g. of diammonium imidodisulfonate, are allowed to react at temperature of 145° to 150 C. After termination of the reaction, the dimethylformamide and the solvent are recovered by distillation at a subatmospheric pressure, and the remaining reaction product is taken out of the flask. The product is a light brown paste, the reaction ratio being 90.4%, calculated with the basis of oleyl alcohol.

What we claim is:

1. A process for the sulfation of unsubstituted higher aliphatic alcohols having from 8 to 20 carbon atoms which comprises reacting the higher alcohols with diammonium imidodisulfonate in the presence of 0.5 to 5 parts by weight per part of the alcohol of a N,N-dialkylcarbamyl compound represented by the general formula

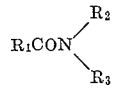

wherein $R_1$ is selected from the group consisting of hydrogen, methyl, and ethyl, and $R_2$ and $R_3$ are selected from the group consisting of methyl and ethyl at a temperature of from 130° C. to 170° C. and thereafter recovering a sulfated higher alcohol.

2. A process according to claim 14, wherein the N,N-dialkylcarbamyl compound is N,N-dimethylformamide.

3. A process according to claim 14, wherein the N,N-dialkylcarbamyl compound is N,N-dimethylacetamide.

4. A process for the sulfation of unsubstituted higher aliphatic alcohols having from 8 to 20 carbon atoms which comprises reacting the higher alcohols with diammonium imidodisulfonate of 0.5 to 0.8 part by weight per part of alcohol of a N,N-dialkylcarbamyl compound and a hydrocarbon solvent having a boiling range between 100° C. and 200° C., said N,N-dialkylcarbamyl compound being represented by the general formula

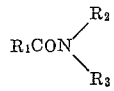

wherein $R_1$ is selected from the group consisting of hydrogen, methyl, and ethyl, and $R_2$ and $R_3$ are selected from the group consisting of methyl and ethyl at a temperature of from about 130° C. to 170° C. and thereafter recovering a sulfated higher alcohol.

5. A process according to claim 4, wherein the N,N-dialkylcarbamyl compound is N,N-dimethylformamide.

6. A process according to claim 4, wherein the N,N-dialkylcarbamyl compound is N,N-dimethylacetamide.

7. A process for the sulfation of unsubstituted higher aliphatic alcohols having 8 to 20 carbon atoms, which comprises mixing the higher alcohol having 8 to 20 carbon atoms, 1.0 to 1.8 times equivalent amount, based upon the alcohol as calculated from $SO_3$ per OH group, of diammonium imidodisulfonate, and 0.5-5 parts by weight per part of alcohol of a N,N-dialkylcarbamyl compound represented by the general formula of $R_1CONR_2R_3$, wherein $R_1$ is selected from the group consisting of hydrogen, methyl, and ethyl, $R_2$ and $R_3$ are selected from the group consisting of methyl and ethyl; heating the resulting mixture at a temperature of 130° to 170° C. for 2 to 6 hours; and distilling out the N,N-dialkylcarbamyl compound to obtain the sulfated higher alcohol.

8. A process according to the claim 7, wherein the N,N - dialkylcarbamyl compound is N,N - dimethylformamide.

9. A process according to the claim 7, wherein the N,N-dialkylcarbamyl compound is N,N-dimethylacetamide.

10. A process according to claim 7 wherein the higher aliphatic alcohols are saturated aliphatic alcohols.

11. A process for the sulfation of unsubstituted higher aliphatic alcohols having from 8 to 20 carbon atoms which comprises reacting the higher alcohols with diammonium imidodisulfonate in the presence of a nitrogen gas atmosphere and 0.5 to 5 parts by weight per part of the alcohol of a N,N-dialkylcarbamyl compound represented by the general formula

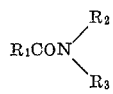

wherein $R_1$ is selected from the group consisting of hydrogen, methyl and ethyl, and $R_2$ and $R_3$ are selected from the group consisting of methyl and ethyl at a temperature of from 130° C. to 170° C. and thereafter recovering a sulfated higher alcohol.

12. A process for the sulfation of unsubstituted higher aliphatic alcohols having 8 to 20 carbon atoms, which comprises mixing a higher alcohol having 8 to 20 carbon atoms, 1.0 to 1.3 times equivalent amount, based upon the alcohol as calculated from $SO_3$ per OH group, of diammonium imidodisulfonate, and a mixture of 0.5–0.8 part by weight per part of alcohol of a N,N-dialkylcarbamyl compound with a hydrocarbon solvent having a boiling range between 100° and 200° C., said N,N-dialkylcarbamyl compound being represented by the general formula of $R_1CONR_2R_3$, wherein $R_1$ is selected from the group consisting of hydrogen, methyl and ethyl, $R_2$ and $R_3$ are selected from the group consisting methyl and ethyl and said solvent amounting 40–60% by weight of the mixture; heating the resulting mixture at a temperature of 120° to 180° C. for 2 to 6 hours; and distilling out the N,N-dialkylcarbamyl compound and the hydrocarbon solvent to obtain the sulfated higher alcohol.

13. A process according to the claim 12, wherein the N,N-dialkylcarbamyl compound is N,N-dimethylformamide.

14. A process according to the claim 12, wherein the N,N-dialkylcarbamyl compound is N,N-dimethylacetamide.

References Cited by the Examiner

UNITED STATES PATENTS

| | | | |
|---|---|---|---|
| 1,931,962 | 10/33 | Marx et al. | 260—458 |
| 2,452,943 | 11/48 | Malkemus et al. | 260—458 |
| 2,493,444 | 1/50 | Clark et al. | 260—450 X |
| 2,513,549 | 7/50 | Clark et al. | 260—459 |

FOREIGN PATENTS 382,942  10/32  Great Britain.

OTHER REFERENCES

Groggins: "Unit Processes in Organic Synthesis," 5th ed., pp. 326–329 (1958).

CHARLES B. PARKER, *Primary Examiner.*